United States Patent
Barki et al.

(10) Patent No.: US 11,051,162 B2
(45) Date of Patent: Jun. 29, 2021

(54) METHOD FOR ANONYMOUSLY IDENTIFYING A SECURITY MODULE

(71) Applicant: Orange, Paris (FR)

(72) Inventors: Amira Barki, Paris (FR); Said Gharout, Paris (FR); Jacques Traore, Saint Georges des Groseillers (FR); Laurent Coureau, Morangis (FR)

(73) Assignee: ORANGE, Paris (FR)

( * ) Notice: Subject to any disclaimer, the term of this patent is extended or adjusted under 35 U.S.C. 154(b) by 129 days.

(21) Appl. No.: 15/778,482

(22) PCT Filed: Nov. 9, 2016

(86) PCT No.: PCT/FR2016/052903
§ 371 (c)(1),
(2) Date: May 23, 2018

(87) PCT Pub. No.: WO2017/089672
PCT Pub. Date: Jun. 1, 2017

(65) Prior Publication Data
US 2018/0352432 A1 Dec. 6, 2018

(30) Foreign Application Priority Data
Nov. 23, 2015 (FR) ...................................... 1561268

(51) Int. Cl.
*H04L 29/00* (2006.01)
*H04W 12/06* (2021.01)
(Continued)

(52) U.S. Cl.
CPC ........... *H04W 12/06* (2013.01); *H04L 9/3073* (2013.01); *H04L 9/3239* (2013.01);
(Continued)

(58) Field of Classification Search
CPC ..... H04W 12/06; H04W 12/02; H04W 12/04; H04L 9/3255; H04L 9/3239; H04L 9/3268; H04L 2209/42
See application file for complete search history.

(56) References Cited

U.S. PATENT DOCUMENTS

| | | | | |
|---|---|---|---|---|
| 2009/0253409 A1* | 10/2009 | Slavov | .................. | H04W 12/35 455/411 |
| 2013/0227292 A1* | 8/2013 | Suffling | ................ | H04L 63/061 713/171 |

(Continued)

FOREIGN PATENT DOCUMENTS

EP   2012248 A2   1/2009

OTHER PUBLICATIONS

Elaheh Vahidian, "Evolution of the SIM to eSIM", Jan. 21, 2013 (Jan. 21, 2013), XP055249025.
(Continued)

*Primary Examiner* — Ellen Tran
*Assistant Examiner* — Helai Salehi
(74) *Attorney, Agent, or Firm* — David D. Brush; Westman, Champlin & Koehler, P.A.

(57) ABSTRACT

A method for anonymously identifying a security module by a server. The method includes: receiving, from the module, a request for the address of a server managing subscription data of an operator, the request including a current identification value of the module, which depends on an identifier of the module and a current date; searching for the current identification value in at least one set of identification values, the set being associated with an operator and including, for a given module, a plurality of identification values, which are calculated depending on the identifier of the module and a date, the date varying for the plurality of identification values of the set between a start date and an end date; and sending, to the security module, the address of the server managing subscription data associated with the operator when the current identification value appears in the set of identification values.

10 Claims, 2 Drawing Sheets

(51) Int. Cl.
  *H04L 9/32* (2006.01)
  *H04W 12/02* (2009.01)
  *H04W 12/04* (2021.01)
  *H04L 9/30* (2006.01)
  *H04W 12/30* (2021.01)
  *H04W 12/75* (2021.01)

(52) U.S. Cl.
  CPC .......... *H04L 9/3255* (2013.01); *H04L 9/3268* (2013.01); *H04W 12/02* (2013.01); *H04W 12/04* (2013.01); *H04W 12/35* (2021.01); *H04L 2209/42* (2013.01); *H04W 12/75* (2021.01)

(56) References Cited

U.S. PATENT DOCUMENTS

2013/0297422 A1* 11/2013 Hunter .................. H04W 4/023
　　　　　　　　　　　　　　　　　　　705/14.58
2014/0379476 A1* 12/2014 Palfreyman ........ G06Q 30/0267
　　　　　　　　　　　　　　　　　　　705/14.58

OTHER PUBLICATIONS

International Search Report dated Feb. 2, 2017 for corresponding International Application No. PCT/FR2016/052903, filed Nov. 9, 2016.
English translation of the International Written Opinion dated Feb. 2, 2017 for corresponding International Application No. PCT/FR2016/052903, filed Nov. 9, 2016.

* cited by examiner

METHOD FOR ANONYMOUSLY IDENTIFYING A SECURITY MODULE

CROSS-REFERENCE TO RELATED APPLICATIONS

This Application is a Section 371 National Stage Application of International Application No. PCT/FR2016/052903, filed Nov. 9, 2016, the content of which is incorporated herein by reference in its entirety, and published as WO 2017089672 on Jun. 1, 2017, not in English.

FIELD OF THE DISCLOSURE

The present invention relates to a method of anonymous identification of a security module when subscribing to a telecommunications operator.

It finds a particularly beneficial application within the framework of the use of security modules embedded in a mass-market mobile device and more particularly when subscribing to a mobile network operator, or when there is a change of operator.

BACKGROUND OF THE DISCLOSURE

The association of mobile telephone operators, or "GSMA" (standing for "Global System for Mobile Communications") has announced the development of an embedded "SIM" (standing for "Subscriber Identity Module"), or "eSIM" card standard, of "eUICC" type (standing for "embedded Universal Integrated Circuit Card") for mass-market mobile devices, such as a mobile terminal or a tablet. An embedded SIM card is intended to be irremovable and (re)programmed remotely. Thus, when acquiring a new mobile device, it is no longer necessary to manipulate the SIM card beforehand in order to access an operator's network, or indeed to change it when there is a change of operator. Provision is made for a user to subscribe directly via the screen of his mobile device, or by going to a shop of the operator or/and for him to install an additional profile for accessing the network on a secondary device. Provision is also made for him to change operator in the same way. An eSIM card is identified in a unique manner by means of a module identifier or "EID" (for "eUICC Identifier"), which constitutes a factory-defined physical identifier of the card. This identifier is not modifiable.

Within the framework of mass-market mobile devices, it is possible that no initial profile for accessing a mobile network is installed in the factory. The device therefore basically has no possibility of accessing the radio pathway. It is conceivable, when taking out a subscription to a mobile network operator, to manage in an intermediate server of the network which is independent of the operators a correspondence between the identifier of the eSIM card and the operator with which the subscription has been taken out and for which the operator has at its disposal an access profile that it has generated for the eSIM card. Thus, when a mobile device wishes to obtain a profile for accessing the network after a subscription is taken out with an operator, it addresses itself to the intermediate server which identifies, on the basis of the identifier of the eSIM card of the mobile device, the operator that generated a profile for this device. The intermediate server then dispatches to the mobile device the address of a management server of the operator from which it can obtain its profile. The mobile device can then establish a connection with the management server of the operator in a data network such as the Internet so as to recover its profile and install it in the eSIM card.

Such a solution offers a certain flexibility in the management of subscriptions by the user who can easily control from his mobile device the activation of a subscription, or of a new subscription in the case of a change of operator. However, this management poses serious problems regarding respect of the user's private life. Indeed, the intermediate server of the network which stores the correspondences between eSIM card identifier and address of a management server of the operator which generated the profile for accessing the network knows at a given instant the operator associated with an eSIM card. It is furthermore capable of tracing all the changes of subscription of the eSIM card in the course of the life of the eSIM card.

SUMMARY

An exemplary embodiment of the invention proposes a method of anonymous identification of a security module by a server, said method comprising:
- reception from the module of a request for address of a server for managing subscription data of an operator, said request comprising a current identification value of the module, said current identification value being dependent on an identifier of the module and a current date,
- searching for the current identification value in at least one set of identification values, said set being associated with an operator and comprising for a given module, a plurality of identification values, an identification value being computed as a function of the identifier of the module and of a date, the date varying for the plurality of identification values of the set between an initial date and a final date,
- dispatching to the security module of the subscription data management server address associated with the operator when the current identification value figures in the set of identification values.

With the method described here, an identification value which is associated with the security module is decorrelated from the physical identifier of the module. Thus, the server of the network which receives such an identification value in order to identify the address of a data management server to be contacted so as to obtain a profile for accessing the network cannot identify the security module which hides behind the identification value. The anonymity of the security module is thus safeguarded.

Moreover, the identification value associated with a security module evolves over time since its computation takes into account a date. A first identification value, generated for a module at a first date when taking out a subscription with a first operator and a second identification value, generated for the same module at a second date, when taking out for example a subscription with a second operator, are therefore necessarily different. Thus, it is not possible for the server to trace the successive subscriptions of a security module when there is a change of operator.

Anonymity and non-traceability contribute to the respect of the private life of the user who owns the mobile device which comprises the security module.

Moreover, searching for the current identification value of the security module in the list of identification values makes it possible to take account of a period of validity of the network access profile. Indeed, if the search for the current identification value of a security module in the list of identification values stored by the server fails, although a subscription has been taken out previously for the mobile device which comprises the security module, this may signify that the profile is no longer available. A validity period is indeed associated with a profile for accessing the network and it is not possible to obtain the profile beyond this validity period. The current identification value of the module taking account of the current date, it might therefore not be present in the identification values list associated with the security module if the current date has exceeded the period of validity of the profile. This avoids needless prompts to the server for managing subscription data of an operator and specific management of the period of validity of the profile.

According to an exemplary embodiment, the method comprises in a prior subscription phase:

reception, from the server for managing the subscription data of the operator of the set of identification values of the module, said set being associated by the server with the operator.

When taking out a subscription with an operator from a mobile device, the subscription data management server generates a set of anonymous identification values which are specific to the module included in the device which takes account of the period of validity of the profile beyond which the profile is no longer valid. This set thus comprises the set of identification values that might be received from the security module in a request for address of subscription data management server of the operator in the guise of current identification value.

In an exemplary embodiment, the method furthermore comprises:

application of a group signature algorithm parametrized by a secret key specific to the security module to the request for address of the subscription data management server of the operator, verification of the signature of the request for address by the server by means of a group public key, associated by means of a public key certificate with a set of modules comprising at least said security module.

The server verifies that the security module is an authentic module which belongs to an identified group, for example a group of security modules arising from one and the same card maker. Moreover, by virtue of the implementation of the group signature algorithm, the server is not capable of individually identifying the module. The security module thus authenticates itself anonymously with the server.

In an exemplary embodiment, an identification value is computed by applying a hash function to a date and by raising the value obtained to the power of an identifier derived from the identifier of the module.

The computation of an identification value of the module, be its a current identification value or an identification value from the list of identification values, guarantees a high level of security. Indeed, such a formula can be reduced to a known problem, the so-called discrete logarithm problem, presumed to be difficult to solve in a reasonable time. Thus, to find the exponent, here EID', knowing the hash of the date is a difficult problem. The anonymity property of the security modules is thus proven mathematically. Likewise, if two values, $H(d_1)^{EID1'}$ and $H(d_2)^{EID2'}$, are available, it is not possible to know whether $EID_1'=EID_2'$. Solving such a problem would amount to solving the Diffie-Hellman decisional problem (or "DDH", for "Decisional Diffie-Hellman"), presumed to be difficult. Thus, the server cannot establish any link between requests for server addresses emanating from one and the same security module or between two lists of identification values. The server may receive such requests when subscribing to different operators. Thus, the non-traceability property is mathematically proven.

In an exemplary embodiment, the derived identifier comprises at least 160 bits. This exemplary embodiment takes account of the fact that the format of a security module identifier can comprise fewer than 160 bits. It is estimated that 160 bits is a sufficient size to guarantee the anonymity and non-traceability properties. It is estimated that currently the ideal value is 256 bits.

In an exemplary embodiment, the derived identifier is obtained by concatenating the identifier of the module with a random value.

In an exemplary embodiment, an identification value is computed by applying a hash function to the concatenation of a first identifier derived from the identifier of the module and of the hash of the concatenation of a second identifier derived from the identifier of the module and the date.

This way of computing an identification value of the module, be it a current identification value or an identification value from the list of identification values offers good performance in terms of computation time. Indeed, the operations implemented are less complex than those described previously.

The invention also relates to a server of a network designed to anonymously identify a security module, said server comprising:

reception means, designed to receive from the module, a request for address of a server for managing subscription data of an operator, said request comprising a current identification value of the module, said current identification value being dependent on an identifier of the module and a current date, search means, designed to search for the current identification value received from the module in at least one set of identification values, said set being associated with an operator and comprising for a given module, a plurality of identification values, an identification value being computed as a function of the identifier of the module and of a date, the date varying for the plurality of identification values of the set between an initial date and a final date, dispatching means, designed to dispatch to the security module the address of the profiles data management server associated with the operator when the current identification value figures in the set of identification values.

The invention also pertains to a system for obtaining a network access profile, comprising:

the server such as described previously, a mobile device comprising the security module, said device being designed to dispatch to the server a request for address of a server for managing the subscription data of the operator, to receive in response the address of said management server, and to connect to the management server so as to obtain the profile, the server for managing subscription data of an operator designed to dispatch to the server the list of identification values of the module and to provide the profile to the mobile device comprising the security module.

The invention also relates to a computer program on a data medium and loadable into the memory of a computer, the program comprising code portions for the execution of the steps of the method such as described previously, when the program is executed on said computer.

The invention also pertains to a data medium in which the program hereinabove is recorded.

BRIEF DESCRIPTION OF THE DRAWINGS

Other characteristics and advantages of the present invention will be better understood from the description and from the appended drawings among which.

DETAILED DESCRIPTION OF ILLUSTRATIVE EMBODIMENTS

Figure 1:
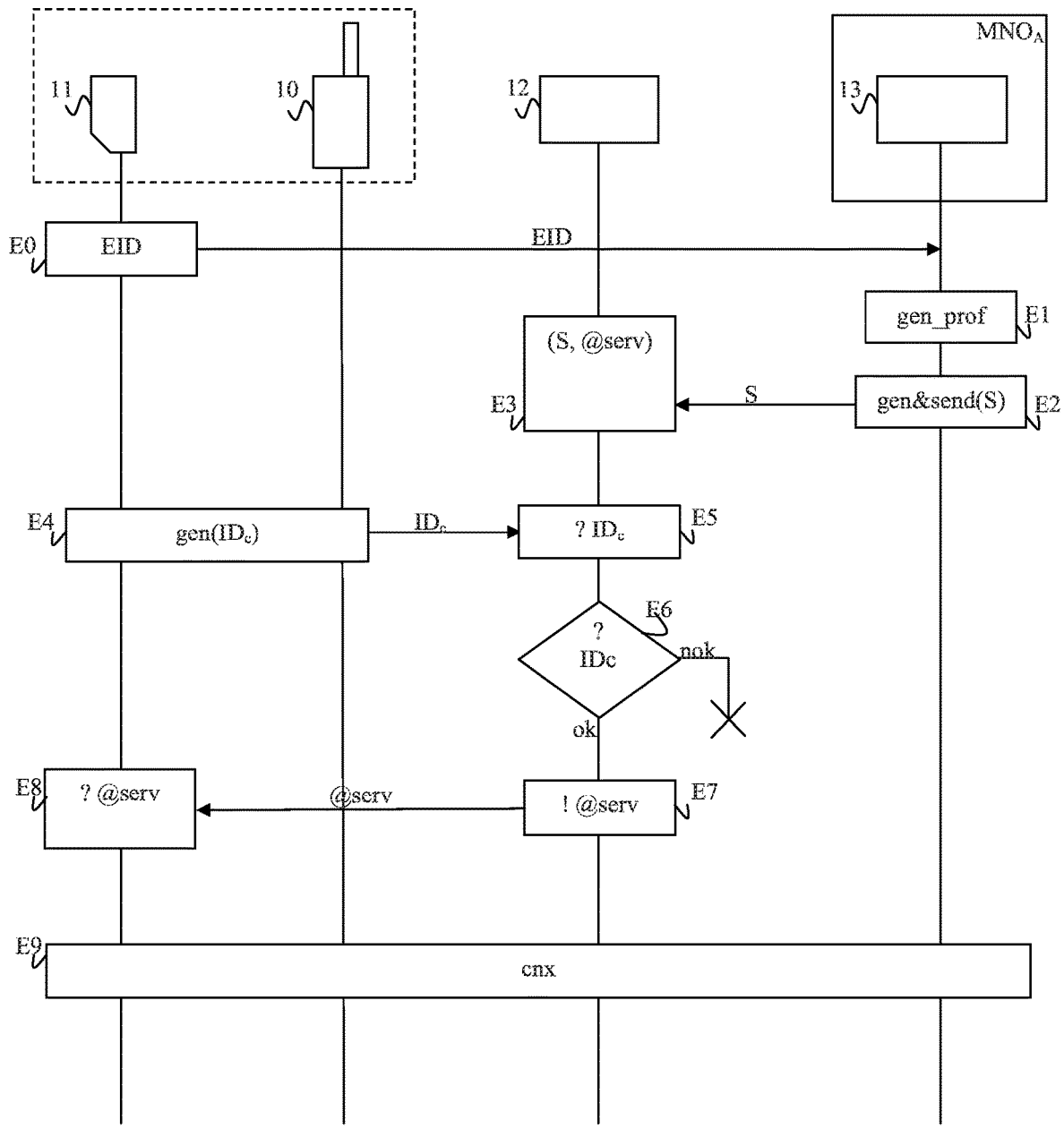
FIG. 1 presents the steps of a method of anonymous identification of a security module, according to an exemplary embodiment.

The steps of a method of anonymous identification of a security module, according to an exemplary embodiment will now be described in conjunction with FIG. 1.

A mobile device 10, for example a mobile terminal or a tablet, equipped with a security module 11 is designed to access the network of a mobile operator $MNO_A$ by means of a profile for accessing the network generated by this operator for this module. More precisely, the profile is generated for this module by a subscription data management server linked with the operator. The profile comprises an application for access to the network and associated access data (one speaks of "credentials"), such as cryptographic keys and algorithms. The profile makes it possible to authenticate the mobile device 10, more precisely the security module 11 during access to the network of the operator $MNO_A$.

The security module 11 is typically an "eSIM" card (standing for "embedded Subscriber Identity Module"), or irremovable SIM card, of "eUICC" type (standing for "embedded Universal Integrated Circuit Card"). Such a security module is identified in a unique manner by means of a module identifier "EID" (for "eUICC Identifier"), which constitutes a factory-defined and unmodifiable physical identifier of the card. When a mobile device is equipped with a security module of eSIM card type, the user of the mobile device 10 can control, via an interface of the mobile device or during a subscription in a shop of the operator, the downloading of the profile into the security module 11. This mode of operation offers a certain flexibility during an initial subscription, or when there is a change of operator.

A discovery server 12, is an intermediate device situated in a data network such as the Internet network. The discovery server 12 is designed to receive from operators, for example from the operator $MNO_A$, and more precisely from a server 13 for managing subscription data of the operator, information that a profile for accessing the network of the operator has been generated for a security module, for example the module 11, and to record the address of the server 13 for managing subscription data of the operator through which the profile can be obtained in association with a list of anonymized identification values which are specific to the security module 11 for which the profile has been generated. The server 12 is also designed to receive requests for address of a server for managing subscription data of an operator originating from mobile devices, more precisely from security modules included in the mobile devices. To this end, the Internet address of the discovery server 12 is installed in the mobile device 10 in the factory. As a variant, the address of the server 12 is installed in the security module 11 in the factory. The discovery server 12 is also designed to provide, in response to a subscription data management server address request prompt emanating from the mobile device 10, the address of the server 13 for managing the subscription data of an operator, here the operator $MNO_A$. The server 13 for managing the subscription data is designed to generate, following a subscription with the operator $MNO_A$, the profile for accessing the network of the operator for the module 11. The security module 11 is designed to connect, via the mobile device 10, to the server 13 for managing the subscription data of the operator, after having obtained its address from the discovery server 12, so as to download the profile for accessing the network of the operator $MNO_A$. The discovery server 12 is independent of the network operators and receives the set of subscription data management server address request prompts originating from the security modules, all operators inclusive.

It is assumed that in an initial step E0, a user, the owner of the mobile device 10, takes out a new subscription with the operator $MNO_A$. The new subscription is for example an initial subscription, following the purchase of the mobile device 10, or, when the user already possesses a subscription to a first operator, a subscription with a second operator. For example, the user of the mobile device 10 goes to an agency of the operator $MNO_A$ and provides the operator with the identifier EID of his security module 11. The identifier EID of the module 11 is for example scanned on the mobile device 10 and transmitted to the server 13 for managing subscription data of the operator $MNO_A$.

In a profile generating step E1, the server 13 for managing subscription data of the operator $MNO_A$ generates a profile for accessing the network of the operator $MNO_A$ for the mobile device 10, more precisely for the security module 11.

In a following step E2 of generating and dispatching a set of identification values, the server 13 for managing the subscription data of the operator commands the generation of a set S of anonymized identification data specific to the security module 11. An anonymized identification datum specific to the security module 11 is computed on the basis of the identifier EID of the security module 11 and of a date. The date varies in a timeslot lying between an initial date $d_s$, representative of the date on which the subscription was taken out with the operator $MNO_A$ and a final date $d_f$, representative of a date of end of validity of the profile. The set S of anonymized identification values thus comprises as many values as dates included in the slot. The timeslot lying between the initial date $d_s$ and the final date $d_f$ defines a time period during which it is possible to download the profile onto the security module 13 once the subscription has been taken out. Indeed, it is considered that the profile is no longer valid if it has not been downloaded onto the security module 11 beyond the final date $d_f$. The granularity of the date is parametrizable. In an exemplary embodiment, the date is a calendar day; hours, minutes and seconds are not taken into account. The set S thus contains as many identification values as days lying between the initial date $d_s$ and the final date $d_f$. The invention is not limited to this example. Thus, the date can correspond to a week, a month, or indeed to an hour.

In a first exemplary embodiment, the set S is generated as follows:

$S=\{H(d_s)^{EID'} \bmod p, H(d_s+1)^{EID'} \bmod p, H(d_s+2)^{EID'} \bmod p, H(d_s+n)^{EID'} \bmod p\}$, where $d_s$ represents the date on which the subscription was taken out, $d_s+n$ the final date $d_f$, EID' an identifier derived from EID, H a hash function and p a very large prime number, for example 2048 bits in modular arithmetic. In this example, the date is a calendar day. The hash function H is for example the function SHA-3, or the function SHA-256. The invention is of course not limited to these hash functions.

In an exemplary embodiment, the derived identifier EID' is equal to the identifier EID of the security module 11.

In another exemplary embodiment, the identifier EID' is derived from EID and comprises at least 160 bits. For example, the derived identifier EID' is obtained by concatenating the identifier EID of the security module 11 with a random value, shared with the security module 11, which comprises the number of bits required. The random value can be generated by a security module manufacturer, or card maker, and previously installed in the security module 11 in the factory. In this case, in the course of the initial step E0, the identifier EID of the security module 11 and the random value are provided to the operator. In this example, it is possible to prove the security of the computed anonymized identification values in the sense that, knowing $H(d_i)^{EID'}$ mod p, with $d_s \leq d_i \leq d_f$, it is not possible to retrieve EID'. Stated otherwise, knowing an anonymized identification value, it is not possible to retrieve the identifier EID' of the associated security module 11. Such a formula can indeed be associated with a known problem termed the discrete logarithm problem, presumed to be difficult to solve in a reasonable time. Thus, the anonymity property is mathematically proven. Likewise, knowing two identification values $H(d_1)^{EID'1}$ mod p and $H(d_2)^{EID'2}$ mod p, it is not possible to ascertain whether they correspond to the same security module, stated otherwise whether $EID'_1 = EID'_2$. Solving such a problem would amount to solving the Diffie-Hellman decisional problem (or "DDH", for "Decisional Diffie-Hellman"), presumed to be difficult. Thus, it is not possible to trace a security module for which a first and a second profile have been generated, the first profile corresponding to a subscription to a first operator and the second profile to a subscription with a second operator. Indeed, it is not possible to correlate identification value sets generated for one and the same security module by different operators. Thus the non-traceability property is mathematically proven.

In an exemplary embodiment, all the computations, including those of the anonymized identification values, are done over a cyclic sub-group of an elliptic curve where the Diffie-Hellman decisional problem is presumed to be difficult to solve. Indeed, elliptic curves guarantee a good level of security with smaller modulos and sizes of keys. For example, a modulo p of 256 bits is sufficient.

The set S of anonymized identification values which is associated with the operator $MNO_A$ is transmitted to the discovery server 12 by the subscription data management server 13 at the end of step E2.

The set S is received by the discovery server 12 in a step E3 of receiving and recording. The discovery server 12 stores the set S of anonymized identification values in association with an address of a management server of the operator $MNO_A$, for example the address of the subscription data management server 13.

Steps E0 to E3 are implemented during a phase of taking out a subscription by the user of the mobile device 10 with the operator $MNO_A$. At this juncture, the profile for accessing the network of the operator is not yet installed on the security module 11 and does not therefore allow the user of the mobile device 10 to access the mobile network of the operator $MNO_A$.

The subscription phase is followed by a profile request phase, intended to allow the mobile device 10 to obtain the profile and to thus access the network of the operator $MNO_A$. This profile request can be made immediately after taking out the subscription, or during the days following the subscription. In any event, the profile may not be obtained beyond its validity period fixed in this example at n days.

In a step E4 of dispatching a server address request prompt, the user commands the dispatching, on the basis of an application of the mobile device 10, of an address request prompt in respect of a server for managing subscription data of the operator $MNO_A$ so as to obtain the access profile that the operator $MNO_A$ has generated therefor during the subscription phase. The address request prompt is issued by the mobile device 10, more precisely by the security module 11 identified by its identifier EID. It comprises a current anonymous identifier $ID_c$, computed by the security module 11 as a function of its identifier EID and of a current date $d_c$. Note that with an aim of coordination between the discovery server 12 and the mobile device 10, provision is made for the mobile device 10 to dispatch a current date measured by the mobile device 10 to the discovery server 12 so that the latter verifies that said date corresponds to a current date measured on the discovery server 12. This coordination makes it possible to ensure that the two entities share the same current date and to alleviate a case where the current date of the mobile device 10 would not yet be parametrized. Indeed, in this case the mobile device 10 would dispatch a default date, for example the 1 Jan. 1970, different from that of the server 12 and inappropriate for implementing comparisons of anonymized identification values. In the example described here, the current anonymous identification value $ID_c$ of the module 11 is computed as follows:

$$ID_c = H(d_c)^{EID'} \mod p$$

Note that if the profile address request prompt is dispatched m days after the date $d_s$ of subscription, then $d_c = d_s + m$.

The prompt for request of address of a server is received by the discovery server 12 in a reception step E5.

In a following search step E6, the discovery server 12 searches for the current anonymous identification value $ID_c$ in the identification value sets S that it has received from operators during the subscription phase. Note that this step is implemented only if the clocks of the mobile device 10 and of the discovery server 12 are consistent.

In a first case where the current anonymous identification value $ID_c$ is not found in any set of identification values ("nok" branch in FIG. 1), then the method stops. This may be the case when the current date $d_c$ is greater than the final date $d_f$, indicating that the profile obtaining request for address was issued after the date of validity of the profile. This may be the case also when the user has not taken out a subscription: no profile has been generated by an operator for the security module 11.

In a second case ("ok" branch in FIG. 1), the current anonymous identification value $ID_c$ figures in the list S of the anonymous identification values which is stored by the discovery server 12. This indicates that the prompt for request of address of a subscription data server was issued by the security module 11 during the period of validity of the profile and that this profile has been generated and is available for the security module 11.

In a response step E7, the discovery server 12 dispatches to the security module 11 a response which comprises the address of the server 13 for managing the subscription data of the operator $MNO_A$ from which the module 11 can obtain the profile.

The response is received by the module 11 in a reception step E8.

In a following step E9 of obtaining the profile, the security module 11 establishes a connection with the operator $MNO_A$, more precisely with the server 13 for managing the subscription data of the operator $MON_A$ whose address figures in the response that it received in the course of step E8 so as to obtain the profile for accessing the network of the operator $MNO_A$. The access profile is downloaded onto the security module 11. The user of the mobile device 10 can then access the mobile network of the operator $MNO_A$.

In an exemplary embodiment, it is verified that the server address request prompt dispatched in the course of step E4 by the security module 11 to the discovery server 12 is authentic. Stated otherwise, it is verified that the prompt emanates from an authentic module. To this end, the security module 11 comprises a first secret key $sk_1$ which is specific to the security module 11 and with which is associated a group public key $pk_G$, certified by a public key certificate, for example a certificate of type X509.v3. The secret key $sk_1$ is intended to be used by the module 11 to sign the server address request prompt dispatched in the course of step E4, by applying a group signature algorithm. The group public key $pk_G$ is intended to be used by the discovery server 12 to verify the authenticity of the prompt. "Authentic prompt" signifies here that the prompt was generated by a security module that possesses one of the secret keys associated with the group public key $pk_G$. Stated otherwise, the security module that signed the prompt forms part of a group for which a certificate has been issued. The group signature mechanisms are assumed to be known. It is recalled here that the verification of a group signature by the discovery server 12 allows it to be sure that the signature was generated by a member of the group; this verification does not however make it possible to identify the member of the group that has signed. In an exemplary embodiment, the group consists of the set of security modules that are manufactured by one and the same card maker. It is assumed that the first secret key $sk_1$ is installed in the security module 11 in the factory. Thus, the security module 11 is authenticated in an anonymous manner by the discovery server 12.

In an exemplary embodiment, the group signature scheme is defined as follows: consider three cyclic groups $G_1$, $G_2$ and $G_T$ of prime order p and a bilinear coupling e: $G_1 \times G_2 \rightarrow G_T$ of type 3. Let h and g be two generators of $G_1$ and o a generator of $G_2$. A manufacturer of security modules, or a card maker, plays the role of group manager and therefore possesses a private key consisting of the triplet $(x_0, x_1, x_2)$. The public key $pk_G$ associated with this private key is: $(X_1=h^{x_1} \mod p, X_2=h^{x_2} \mod p, O_0=o^{x_0} \mod p, O_1=o^{x_1} \mod p, O_2=o^{x_2} \mod p)$. The group manager installs in the security module 11 a group certificate $\sigma=(u, u'=u^{x_0+EID'x_1+sx_2} \mod p)$, where u is randomly chosen and where s is a secret of the module 11.

To generate a group signature, the security module 11 firstly randomizes its group certificate by computing $\sigma_r = (w=u^r \mod p, w'=(u')^r \mod p)$, where r is randomly chosen. Thereafter, it chooses three random values $z_1$, $z_2$ and $z_3$ and then computes the following values:
$c_1=w^{EID'}h^{z_1} \mod p$, $c_2=w^s h^{z_2} \mod p$, $c'=w'g^{z_3} \mod p$ and $V=g^{-z_3}X_1^{z_1}X_2^{z_2} \mod p$ The group signature of the value $Id_c=H(d_c)^{EID'}$, is $\omega=(w, c_1, c_2, c', V, \pi)$, where $\pi$ is a proof of knowledge without disclosure of knowledge "ZKPK" (standing for "Zero Knowledge Proof of Knowledge") defined as follows: $\pi=PoK [\alpha, \beta, \gamma, \lambda, \varphi: c_1=w^\alpha h^\gamma \mod p \hat{} c_2= w^\beta h^{\lambda} \hat{} V=g^{-\varphi}X_1^\gamma X_2^\lambda \hat{} Id_c=H(d_c)^\alpha]$ where $\alpha, \beta, \gamma, \lambda$ and $\varphi$ correspond to secret values known by the module 11 and knowledge of which it wishes to prove. The notation $\pi=PoK [\alpha, \beta$: statement concerning $\alpha$ and $\beta$] is used to prove the knowledge of the secrets $(\alpha, \beta)$ which satisfy a certain statement without revealing anything more in regard to the secrets. By virtue of this conventional proof, the security module 11 proves that it knows the secret values EID', s, $z_1$, $z_2$ and $z_3$ without revealing anything more.

To verify the group signature, in particular that the module 11 does indeed possess a valid group certificate and the associated secrets, the discovery server 12 computes and firstly verifies that: $e(w, O_o) \cdot e(c_1, O_1) \cdot e(c_2, O_2) \cdot e(c', o)^{-1} = e(V, o)$. Thereafter, it verifies the validity of the proof $\pi$.

This group signature scheme is suitable for the limited computational capabilities of security modules of (e)SIM card type. Indeed, the proposed scheme is much less complex in terms of required computational capabilities and offers better performance in terms of computation time than the conventional group signature schemes.

In another exemplary embodiment a secure channel is established between the security module 11 and the server 13 for managing the subscription data during step E9 of obtaining the profile. For example, the security module has a second private key sk2 associated with a public key pk2 certified by a public key certificate. The establishing of the secure channel between the server 13 for managing the subscription data and the security module 11 is assumed to be known and is not detailed here.

In the example described here, the elements of the set S of anonymized identification values and the current identifier $ID_c$ of the security module 11 are computed by applying a hash function H to a date d and by raising the value obtained to the power of the derived identifier EID' of the module 11, modulo the prime number p. In another exemplary embodiment, the set S is computed as follows:

$$S=\{H((EID''\oplus opad)\|H((EID''\oplus ipad)\|d_s))), H((EID''\oplus opad)\|H((EID''\oplus ipad)\|d_s+1))), \ldots, H((EID''\oplus opad)\|H((EID''\oplus ipad)\|d_s+n)))\}, \text{ where}$$

"$\|$" represents the concatenation operator, EID'' an identifier obtained by adding '0's to EID' so as to obtain an identifier of the size of a block of the hash function H. Stated otherwise EID''=EID'$\|$ 00 . . . 00. ipad and opad are constructed by repeating respectively the bytes '0x36' and '0x5c' until a block of the hash function H is obtained. The current identifier $ID_c$ is computed in this case in the same manner for the current date $d_c$: $ID_c = H((EID'' \oplus opad)\|H((EID''\oplus ipad)\|d_c)))$.

This mode of computation exhibits the advantage of offering better performance in terms of computation time since the computations are less complex than those implemented in the exemplary embodiment described previously. Moreover, the security properties are satisfied: finding the identifier EID' associated with a security module and identifying that two anonymized identification values relate to one and the same security module remains a problem which is difficult to solve.

Figure 2:
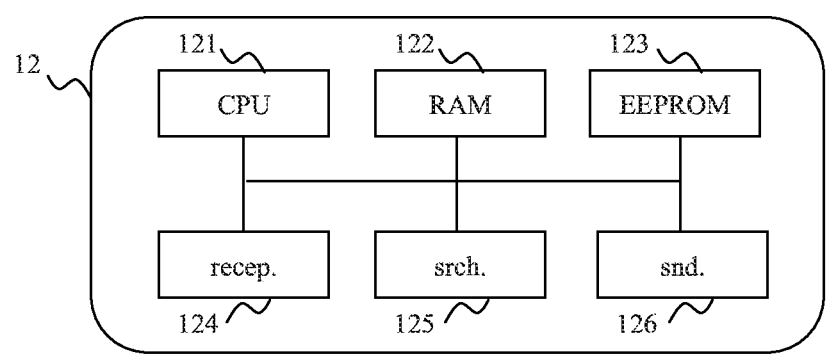
FIG. 2 is a schematic representation of a discovery server, according to an exemplary embodiment.

A discovery server, according to an exemplary embodiment, will now be described in conjunction with FIG. 2.

The discovery server 12 is a computing device, accessible from a data network such as the Internet network. It comprises:

- a processing unit or processor 121, or "CPU" (standing for "Central Processing Unit"), intended for loading instructions into memory, for executing them, for performing operations;
- a set of memories, including a volatile memory 122, or "RAM" (for "Random Access Memory") used to execute code instructions, to store variables, etc., and a storage memory 123 of "EEPROM" type (standing for "Electrically Erasable Programmable Read Only Memory"). In particular, the storage memory 123 is designed to store a software module for anonymous identification of a security module which comprises code instructions for implementing the steps of the method of anonymous identification of a security module such as described previously.

The discovery server also comprises:

a reception module 124, designed to receive from the security module 11 and via the mobile device 10, a request for address of the server for managing subscription data of the operator with which a subscription has been taken. The request comprises a current identification value $ID_c$ of the module, computed on the basis of the identifier of the security module 11 and of the current date $d_c$. The module 124 is designed to implement step E5 of the method of anonymous identification of a module such as described previously;

a search module 125, designed to search for the current identification value $ID_c$ received from the security module 11 in at least one set S of identification values. A set S of identification values is received from an operator as soon as a subscription is taken out with this operator. The set S comprises for a given module, a plurality of anonymized identification values, an identification value of the set being computed as a function of the identifier of the module and of a date, the date varying for the plurality of identification values of the set between an initial date $d_s$ and a final date $d_f$. The set S of anonymized identification values is stored by the discovery server 12 in association with the address of a server of the operator from which the profile can be obtained. The search module 125 is designed to implement step E6 of the method of anonymous identification of a security module such as described previously;

a dispatching module 126, designed to dispatch to the security module 11, the address of the server for managing subscription data of the operator when the current identification value $ID_c$ figures in the set of identification values. The dispatching module 126 is designed to implement step E7 of the method described previously.

In an exemplary embodiment, the discovery server 12 also comprises:

a second reception module (not represented in FIG. 2), designed to receive from the server for managing the subscription data of the operator, the set S of identification values of the security module and to associate this set with the address of the server for managing the subscription data of the operator from which the profile can be obtained. The second reception module is designed to implement step E3 of the method of anonymous identification of a security module such as described previously.

The reception module 124, search module 125, dispatching module 126, and the second reception module are preferably software modules comprising software instructions for implementing the steps of the method of anonymous identification of a security module previously described.

The invention therefore also relates to:

a computer program comprising instructions for the implementation of the method of anonymous identification of a security module such as described previously when this program is executed by a processor of the discovery server 12, a readable recording medium on which the computer program described hereinabove is recorded.

The invention also relates to an anonymous identification system which comprises a discovery server 12 such as described previously, a mobile device furnished with a security module 11 and a server 13 for managing subscription data of the operator. The mobile device is designed to dispatch to the discovery server 12 a request for address of a server for managing the subscription data of the operator, to receive in response the address of said management server, and to connect to the management server in order to obtain the profile. The server for managing subscription data of the operator is designed to dispatch to the discovery server 12 a list of anonymized identification values of the module that it has computed and to provide the mobile device comprising the security module with the profile that it has generated for the module during a subscription phase.

An exemplary embodiment of the invention remedies inadequacies/drawbacks of the prior art and/or to affords improvements thereto.

Although the present disclosure has been described with reference to one or more examples, workers skilled in the art will recognize that changes may be made in form and detail without departing from the scope of the disclosure and/or the appended claims.

The invention claimed is:

1. A method of anonymous identification of a security module by a server, said method comprising:

receiving from the module a request for an address of a management server for managing subscription data of an operator, said request comprising a current identification value of the module, said current identification value being dependent on an identifier of the module and a current date, searching for the current identification value in at least one set of identification values, said set being associated with an operator and comprising for a given module, a plurality of identification values, each of the identification values being computed as a function of the identifier of the module and of a date, the date varying for the plurality of identification values of the set between an initial date and a final date, dispatching to the security module the address of the management server associated with the operator when the current identification value figures in the set of identification values, applying a group signature algorithm to the identifier of the security module comprising:

providing three cyclic groups G1, G2 and G3 of prime order p and a bilinear coupling e: $G1 \times G2 \rightarrow G3$, wherein h and g are two generators of G1, and o is a generator of G2, providing a private key that includes a triplet of random data $(X_0, X_1, x_2)$, providing a public key $pk_G$ associated with the private key defined as $(X_1=h^{x_1} \bmod p, X_2=h^{x_2} \bmod p, O_0=o^{x_0} \bmod p, O_1=o^{x_1} \bmod p, O_2=o^{x_2} \bmod p)$, installing a group certificate in the security module, wherein said group certificate being defined as follows $\sigma=(u, u'=u^{x_0+EID'x_1+sx_2} \bmod p)$, wherein u is randomly chosen, and s is a secret of the security module, and generating a group signature of the identifier based on a randomization of the group certificate, sending the group signature including a proof of knowledge without disclosure of knowledge of the identifier to the subscription data management server of the operator using the security module, and verifying the group signature of the identifier by the server by using the public key.

2. The method as claimed in claim 1 comprising in a prior subscription phase:
receiving, from the server for managing the subscription data of the operator the set of the identification values of the module, said set being associated by the server with the operator.

3. The method as claimed in claim 1, furthermore comprising:
applying a group signature algorithm parametrized by a secret key specific to the security module to the request for address of the subscription data management server of the operator,
verifying the signature of the request for address by the server by using a group public key, associated by a public key certificate with a set of modules comprising at least said security module.

4. The method as claimed in claim 1, in which the server computes an identification value by applying a hash function to a date and by raising the value obtained to the power of an identifier derived from the identifier of the module.

5. The method as claimed in claim 1, in which an identification value is computed by applying a hash function to the concatenation of a first identifier derived from the identifier of the module and of the hash of the concatenation of a second identifier derived from the identifier of the module and the date.

6. The method as claimed in claim 4, in which the derived identifier comprises at least 160 bits.

7. The method as claimed in claim 6, in which the derived identifier is obtained by concatenating the identifier of the module with a random value.

8. An apparatus comprising:
a processor; and
a non-transitory computer-readable medium comprising instructions stored thereon, which when executed by the processor configure the processor to form a first server of a network to anonymously identify a security module, said first server being configured by the instructions to perform acts comprising:
receiving from the module, a request for an address of a management server for managing subscription data of an operator, said request comprising a current identification value of the module, said current identification value being dependent on an identifier of the module and a current date,
searching for the current identification value received from the module in at least one set of identification values, said set being associated with an operator and comprising for a given module, a plurality of identification values, each of the identification values being computed as a function of the identifier of the module and of a date, the date varying for the plurality of identification values of the set between an initial date and a final date,
dispatching to the security module the address of the management server associated with the operator when the current identification value figures in the set of identification values,
applying a group signature algorithm to the identifier of the security module comprising:
providing three cyclic groups G1, G2 and G3 of prime order p and a bilinear coupling e: G1×G2→G3, wherein h and g are two generators of G1, and o is a generator of G2,
providing a private key that includes a triplet of random data $(x_0, x_1, x_2)$, providing a public key $pk_G$ associated with the private key defined as $(X_1=h^{x_1} \bmod p, X_2=h^{x_2} \bmod p, O_0=o^{x_0} \bmod p, O_1=o^{x_1} \bmod p, O_2=o^{x_2} \bmod p)$,
installing a group certificate in the security module, wherein said group certificate being defined as follows $\sigma=(u, u'=u^{x_0+EID'x_1+sx_2} \bmod p)$, wherein u is randomly chosen, and s is a secret of the security module, and
generating a group signature of the identifier based on a randomization o group certificate,
sending the group signature including proof of knowledge without disclosure of knowledge of the identifier to the subscription data management server of the operator using the security module, and
verifying the group signature of the identifier by the server by using the public key.

9. The apparatus according to claim 8, further comprising, comprising:
a mobile device comprising the security module, said mobile device being designed to dispatch to the server a request for the address of the management server for managing the subscription data of the operator, to receive in response the address of said management server, and to connect to the management server so as to obtain a network access profile and
the management server for managing subscription data of the operator and which is designed to dispatch to the first server the plurality of identification values of the module and to provide the network access profile to the mobile device comprising the security module.

10. A non-transitory computer-readable data medium comprising program code instructions recorded thereon, which when executed by a processor of a server configure the server to anonymously identify a security module by performing the following acts:
receiving from the module a request for an address of a management server for managing subscription data of an operator, said request comprising a current identification value of the module, said current identification value being dependent on an identifier of the module and a current date,
searching for the current identification value in at least one set of identification values, said set being associated with an operator and comprising for a given module, a plurality of identification values, each of the identification values being computed as a function of the identifier of the module and of a date, the date varying for the plurality of identification values of the set between an initial date and a final date,
dispatching to the security module he address of the management server associated with the operator when the current identification value figures in the set of identification values,
applying a group signature algorithm to the identifier of the security module comprising:
providing three cyclic groups G1, G2 and G3 of prime order p and a bilinear coupling e: G1×G2→G3, wherein h and g e two generators of G1, and o is a generator of G2,
providing a private key that includes a triplet of random data $(x_0, x_1, x_2)$,
providing a public key $pk_G$ associated with the private key defined as $(X_1=h^{x_1} \bmod p, X_2=h^{x_2} \bmod p, O_0=o^{x_0} \bmod p, O_1=o^{x_1} \bmod p, O_2=o^{x_2} \bmod p)$,
installing a group certificate in the security module, wherein said group certificate being defined as follows $\sigma=(u, u'=u^{x_0+EID'x_1+sx_2} \mod p)$, wherein u is randomly chosen, and s is a secret of the security module, and generating a group signature of the identifier based on a randomization of the group certificate, sending the group signature including a proof of knowledge without disclosure of knowledge of the identifier to the subscription data management server of the operator using the security module, and verifying the group signature of the identifier by the server by using the public key.

* * * * *